(12) United States Patent
Gustof et al.

(10) Patent No.: US 12,423,976 B2
(45) Date of Patent: Sep. 23, 2025

(54) DEVICE, SYSTEM, AND METHOD FOR ALTERING VIDEO STREAMS TO IDENTIFY OBJECTS OF INTEREST

(71) Applicant: MOTOROLA SOLUTIONS, INC., Chicago, IL (US)

(72) Inventors: Grzegorz Gustof, Cracow (PL); Pawel Wilkosz, Cracow (PL); Lukasz Osuch, Cracow (PL); Marcin Kalinowski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 394 days.

(21) Appl. No.: 17/872,449

(22) Filed: Jul. 25, 2022

(65) Prior Publication Data
US 2024/0029435 A1    Jan. 25, 2024

(51) Int. Cl.
*G06V 20/40*    (2022.01)
*G06F 16/783*    (2019.01)

(52) U.S. Cl.
CPC .......... *G06V 20/46* (2022.01); *G06F 16/7837* (2019.01)

(58) Field of Classification Search
CPC .... G06V 20/46; G06V 10/255; G06V 10/764; G06V 20/41; G06V 20/52; G06F 16/7837; G11B 27/28; H04N 7/181; H04N 21/23418; H04N 21/44008; H04N 21/42201
See application file for complete search history.

(56) References Cited

U.S. PATENT DOCUMENTS

| 8,754,901 | B2 | 6/2014 | Angell et al. | |
|---|---|---|---|---|
| 10,282,720 | B1 | 5/2019 | Buibas et al. | |
| 10,395,385 | B2 | 8/2019 | Zhou et al. | |
| 2008/0204569 | A1 | 8/2008 | Miller et al. | |
| 2015/0332476 | A1* | 11/2015 | Park | G06V 40/20 348/169 |
| 2017/0111576 | A1* | 4/2017 | Tojo | G06T 3/40 |
| 2017/0364752 | A1* | 12/2017 | Zhou | G06V 10/462 |
| 2018/0189600 | A1* | 7/2018 | Astrom | G06T 7/292 |

(Continued)

FOREIGN PATENT DOCUMENTS

| KR | 101679318 B1 | 11/2016 |
|---|---|---|
| KR | 20210010640 A | 1/2021 |

(Continued)

*Primary Examiner* — Amandeep Saini
*Assistant Examiner* — Andrew S Budisalich
(74) *Attorney, Agent, or Firm* — PERRY + CURRIER INC. (FOR MSI)

(57) ABSTRACT

A device, system, and method for altering video streams to identify objects of interest is provided. A devices analyzes: media data to determine one or more visual traits of an object-of-interest (OOI); and a first video stream to determine that the visual trait(s) are not identifiable at the first video stream, the first video stream being rendered at a display screen. The device identifies at least one of the visual trait(s) at a second video stream to identify the OOI at the second video stream, the second video stream associated with the first video stream. The device identifies the OOI at the first video stream using the OOI as identified in the second video stream. The device alters the first video stream at the display screen to visually indicate one or more of: the and at least one of visual trait(s) identified at the second video stream.

20 Claims, 6 Drawing Sheets

(56) References Cited

U.S. PATENT DOCUMENTS

| | | | |
|---|---|---|---|
| 2019/0141919 A1* | 5/2019 | Kundra | G06V 20/188 |
| | | | 348/159 |
| 2021/0042502 A1 | 2/2021 | Adato et al. | |
| 2021/0097291 A1* | 4/2021 | Kosiakova | G06T 7/11 |
| 2021/0289264 A1 | 9/2021 | Booth et al. | |
| 2022/0020230 A1 | 1/2022 | Tal et al. | |
| 2023/0039641 A1* | 2/2023 | Zhang | G06N 3/0464 |
| 2023/0047455 A1* | 2/2023 | Chen | G06V 10/255 |
| 2024/0054248 A1* | 2/2024 | Dille | G06F 21/6254 |
| 2024/0064346 A1* | 2/2024 | Xia | G06V 40/171 |

FOREIGN PATENT DOCUMENTS

| | | |
|---|---|---|
| WO | 2020111311 A1 | 6/2020 |
| WO | PCT/US2023/028235 | 7/2023 |

* cited by examiner

DEVICE, SYSTEM, AND METHOD FOR ALTERING VIDEO STREAMS TO IDENTIFY OBJECTS OF INTEREST

BACKGROUND OF THE INVENTION

Video from cameras is often streamed to display screens of a public safety answering point (PSAP). However, it may be challenging to identify objects of interest in such video when conditions, and the like, of the video obscure such objects of interest.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
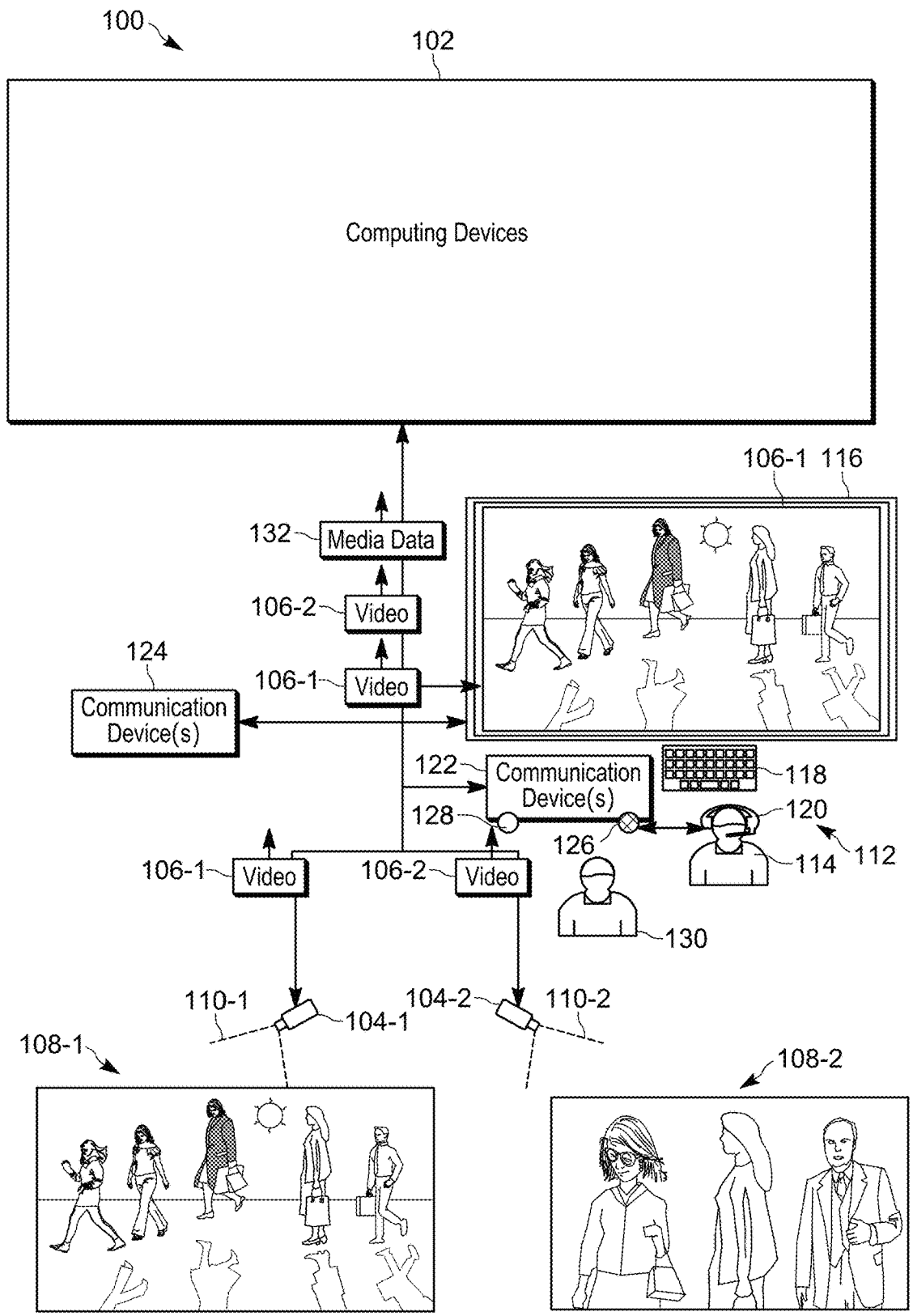
FIG. 1 is a system for altering video streams to identify objects of interest, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Video from cameras is often streamed to display screens of public safety Answering point (PSAP). However, it may be challenging to identify objects of interest in such video when conditions, and the like, of the video obscure such objects of interest. Thus, there exists a need for an improved technical method, device, and system for altering video streams to identify objects of interest.

Hence, provided herein is a device, system, and method for altering video streams to identify objects of interest. For example, a computing device of a PSAP may receive media data in which an object of interest (OOI) is identified. Such media data may include audio and/or text and/or images and/or video received from microphones and/or headsets and/or cameras of communication devices operated by first responders and/or PSAP operators, and/or a microphone in an areas where PSAP operators are located. In one example, the media data may include audio and/or text such as "Has anybody seen middle-aged woman in a white jacket?" such that an OOI identified in the media data includes a "middle-aged woman in a white jacket".

A PSAP operator (e.g. a dispatcher and the like) may be at a PSAP terminal that includes a display screen to which video from CCTV (closed circuit television) cameras is being streamed, and the PSAP operator may be reviewing the streamed video for OOIs, such as the "middle-aged woman in a white jacket", but lighting conditions, and/or the like, in the video may be such that the OOI is not identifiable. For example, bright sunlight in the video may make it challenging to identify colors of objects and/or whether an object is a black object or a white object. Similarly, when an OOI is of a color other than white, black, or gray, (e.g. red), the video may be in black and white (e.g. not color) and hence colors may be not identifiable. In other examples, an OOI may include a person who may be carrying a specific item, such as a weapon, and the like, and the item may not be visible in the video (e.g. as the item may be in a pocket of the person).

Hence, the computing device is generally configured to analyze a first video stream, from a first camera, to determine that one or more visual traits of an OOI, identified from the media data, are not identifiable at the first video stream. The computing device however has access to other video streams from other cameras (e.g. whose fields-of-view may not overlap with the first camera). The computing device may identify the one or more visual traits of the OOI in a second video stream from a second camera and use such the identification to also identify the OOI in the first video stream. The computing device may alter the first video stream to identify the OOI, and/or the one or more visual traits thereof, for example by placing an image on the OOI in the first video stream. The first video stream as altered may be rendered at a display screen of PSAP terminal such that an operator of the PSAP terminal is alerted as to the presence of the OOI in the first video stream. Such altering may reduce use of processing resources in a system that includes the computing device and the PSAP terminal, as without such altering, the PSAP terminal may be operated to review the first video stream repeatedly to search for the OOI and/or the PSAP terminal may be operated to review other video streams repeatedly to search for the OOI.

A first aspect of the present specification provides a method comprising: analyzing, via a computing device, media data to determine one or more visual traits of an object-of-interest (OOI); analyzing, via the computing device, a first video stream to determine that the one or more visual traits are not identifiable at the first video stream, the first video stream being rendered at a display screen; identifying, via the computing device, at least one of the one or more visual traits at a second video stream to identify the OOI at the second video stream, the second video stream associated with the first video stream; identifying, via the computing device, the OOI at the first video stream using the OOI as identified in the second video stream; and altering, via the computing device, the first video stream at the display screen to visually indicate one or more of: the OOI; and at least one of the one or more visual traits identified at the second video stream.

A second aspect of the present specification provides a device comprising: a communication unit configured to receive media data and video streams; and a controller configured to: analyze media data to determine one or more visual traits of an object-of-interest (OOI); analyze a first video stream to determine that the one or more visual traits are not identifiable at the first video stream, the first video stream being rendered at a display screen; identify at least one of the one or more visual traits at a second video stream to identify the OOI at the second video stream, the second video stream associated with the first video stream; identify the OOI at the first video stream using the OOI as identified in the second video stream; and alter the first video stream at the display screen to visually indicate one or more of: the OOI; and at least one of the one or more visual traits identified at the second video stream.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for altering video streams to identify objects of interest. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links, and/or wireless and/or wired communication networks, and the like.

The system 100 comprises a computing device 102, such a PSAP computing device, which may comprise one or more servers and/or one or more cloud computing devices, and the like, in any suitable format and/or combination. In some examples, functionality of the computing device 102 may be distributed over a plurality of servers, a plurality of cloud computing devices and the like. Details of the computing device 102 are described in more detail below with respect to FIG. 2.

The system 100 further includes at least two cameras 104-1, 104-2 referred to hereafter, collectively, as the cameras 104 and generically as a camera 104. This convention will be used throughout the present specification. However, an individual camera 104 is interchangeably referred to hereafter as a first camera 104-1 and a second camera 104-2. While only two cameras 104 are depicted, the system 100 may comprise more than two cameras 104. The cameras 104 may comprise CCTV cameras and/or any other type of camera to which the computing device 102 has been granted access.

As depicted, the computing device 102 is in communication with the cameras 104 and is receiving a first video stream 106-1 from the first camera 104-1, and a second video stream 106-2 from the second camera 104-2 (e.g. the video streams 106 and/or a video stream 106). As depicted, the cameras 104 are pointed in different directions and, in some examples, may have non-overlapping fields-of-view.

For example, the video streams 106-1, 106-2 comprises respective streams of images of respective scenes 108-1, 108-2 (e.g. scenes 108 and/or a scene 108) acquired within respective fields-of-view (FOVs) 110-1, 110-2 (e.g. FOVs 110 and/or a FOV 110) of the cameras 104-1, 104-2. As depicted, the FOVs 110 do not overlap, though the scenes 108 of the FOVs 110 may be along a same path and/or a same street, and/or in a same location but pointing in different directions, and the like.

Hereafter, reference to an OOI being "in" a video stream 106 is understood to include an image of a video stream 106 comprising an image of the OOI.

Furthermore, it is understood that the video streams 106 may comprise video streams from non-overlapping (e.g. different) time periods. For example, the first video stream 106-1 may comprise a video stream of images that are being presently acquired by the first camera 104-1, and the second video stream 106-2 may comprise a respective video stream of images that are being presently acquired by the second camera 104-2 at an earlier time. Hence, in some examples described herein, the first video stream 106-1 may comprise a "live" and/or "real-time" video stream, while the second video stream 106-2 may comprise a video stream that was earlier received at the computing device 102, but stored and/or recorded in a memory of the computing device 102.

As such, in these examples, images from the first video stream 106-1 may include different potential OOIs (e.g. that may be identified by altering the first video stream 106-1 as described herein), such as one or more persons, animals, vehicles and the like at a present time, and images from the second video stream 106-2 may comprise one or more of the same potential OOIs, but at an earlier time.

In particular, potential OOIs may be difficult to identify in the first video stream 106-1, and/or may be obscured in the first video stream 106-1, due to one or more of lighting conditions in the scene 108-1 represented in the first video stream 106-1. For example, as depicted, in the first scene 108-1, the sun is low in the sky and the lighting conditions and/or an angle of the FOV 110-1 of the first camera 104-1 may obscure potential OOIs.

In another example, potential OOIs may be difficult to identify in the first video stream 106-1, and/or may be obscured in the first video stream 106-1, as the first video stream 106-1 may be in black and white, while a known visual trait of a potential OOI may be in color.

In another example, potential OOIs may be difficult to identify in the first video stream 106-1, and/or may be obscured in the first video stream 106-1, due to an item being held by a potential OOI being hidden (e.g. due to an angle of the FOV 110-1 of the first camera 104-1 and/or the item being in a pocket, and the like of a potential OOI), amongst other possibilities.

In contrast, the second video stream 106-2 may comprise images acquired within a FOV 110-2 of the second camera 104-2 which may include images of a specific OOI that is also in images from the first video stream 106-1, but acquired at an earlier time than the images of the first video stream 106-1. In particular, potential may be easier to identify in the second video stream 106-2 than in the first video stream 106-1 due to different lighting conditions in the second video stream 106-2 than in the first video stream 106-1, a different angle of the FOV 110-2 of the second camera 104-2 than the angle of the FOV 110-1 of the first camera 104-1, different colors in the second video stream 106-2 than in the first video stream 106-1, amongst other possibilities.

For example, as depicted, the second video stream 106-2 includes a woman wearing a white jacket who, as will be described herein, is also in the first video stream 106-1. In particular, a specific OOI in the second video stream 106-2 may be identifiable as the lighting conditions, angle etc., are different in the FOV 110-2 of the second video stream 106-2 than in the FOV 110-1 of the first video stream 106-1. As such, identification of the specific OOI in the second video stream 106-2 may enable the computing device 102 to identify the specific OOI in the first video stream 106-1, as described in more detail below.

As depicted, the computing device 102 is further in communication with a PSAP terminal 112, operated, for example, by an operator 114, such as a PSAP call-taker, a dispatcher, and the like.

As depicted, the PSAP terminal 112 includes a display screen 116, one or more input devices 118 (e.g., such as keyboards (as depicted), pointing devices and the like), and a combination a speaker and a microphone, for example in the form of a headset 120 worn by the operator 114.

In general, the PSAP terminal 112 may include any suitable combination of components that enable an operator 114 to communicate on a call (e.g., 911 calls to a PSAP) and/or dispatch first responders (e.g., such as the first responder to 108) incidents, and/or interact with the display screen 116 and/or communicate with the computing device 102, and the like.

In particular, the operator 114 may operate the PSAP terminal 112 to review the first video stream 106-1 rendered at the display screen 116. Hence, in some example, the first video stream 106-1 may be streamed to the PSAP terminal 112 and rendered at the display screen 116. The operator 114 may operate the PSAP terminal 112 to control such rendering and may use the input device 118 to pause, forward or reverse the first video stream 106-1, and/or jump to different images of the first video stream 106-1 (e.g. at specific times and the like). Hence, while not depicted, the first video stream 106-1, and/or portions thereof, may alternatively be stored, at least temporarily stored, at a memory and/or database (not depicted) of the system 100, such as at a memory of the computing device 102.

For example, the operator 114 may be tasked with reviewing the first video stream 106-1 to look for a certain OOI.

While only one PSAP terminal 112 is depicted with the computing device 102, the computing device 102 may be in communication with tens to hundreds of terminals 112, and/or any suitable number of PSAP terminals 112, which may be local to, and/or remote from, an associated PSAP and/or the computing device 102.

As depicted, the PSAP terminal 112 further includes a communication device 122 connected to the headset 120 that enables the operator 114 to communicate with other operators of other PSAP terminals 112, who may be local or remote to the depicted PSAP terminal 112, and/or other communication devices 124 (only one of which is depicted in FIG. 1) which may comprise communication devices of other PSAP terminals 112, first responders (not depicted), and the like. As such, the communication devices 122, 124 may include any suitable wired and/or wireless communication devices, such as radios, cellphones, mobile devices, non-mobile devices, on which media data may be provided, such as audio, video, text, and the like.

The headset 120 and the communication device 122 are generally understood to be associated with the display screen 116, for example as the display screen 116, the headset 120 and the communication device 122 are components of the PSAP terminal 112.

In a particular example, the communication device 122 optionally includes, and/or is in communication with, a microphone 126 and a sensor and/or camera 128 located, for example, in an area where the display screen 116 and/or the operator 114 is located. The sensor and/or camera 128, when present, may be used to determine environmental conditions, such as lighting conditions, in an area where the display screen 116 is located, as described herein.

The microphone 126 may pick up audio of others in the area, such as a supervisor 130, and the like, who may be providing instructions to the operator 114 to search for an OOI in the first video stream 106-1. For example, the supervisor 130 may instruct the operator 114 to look for "a middle-aged woman in a white jacket", and such audio may be acquired by the microphone 126 and provided to the computing device 102 as any suitable media data 132 (e.g. and which may be converted to text using any suitable speech-to-text process being implemented at the computing device 102 and/or the communication device 122).

Alternatively, the supervisor 130 may generally ask "Has anybody seen middle-aged woman in a white jacket?" and/or verbally identify an OOI in any suitable manner, and such audio may be acquired by the microphone 126 and provided to the computing device 102 as any suitable media data 132.

Alternatively, communication received via the headset 120 and the communication devices 122, 124 may provide similar audio that identifies an OOI, on communication links therebetween, which may be provided to the computing device 102 as any suitable media data 132.

However, an OOI may be identified using via any suitable media data 132, that may be provide from the communication devices 122, 124, the microphone 126, the headset 120 or any other suitable source of media data in the system 100 that is different from the cameras 104. For example, the operator 114 may say, into a microphone of the headset 120, that they are looking for a "middle-aged woman in a white jacket", and such audio may be provided to the computing device 102 as any suitable media data.

While media data 132 has been described as audio, the media data 132 may comprise any suitable combination of one or more of audio, video (e.g. that includes a an image of an OOI, video showing use of sign language that identifies an OOI, amongst other possibilities), images (e.g. that includes a an image of an OOI), text (e.g. text messages, email, and the like), and the like, from any suitable communication device and/or sensor (e.g. such as the microphone 126) of the system 100, and is understood that the media data 132 generally identifies an OOI. Respective communication devices 122, 124 and/or other sources of media data in the system 100, may hence comprise any suitable combination of input devices and/or sensors that may acquire the media data 132.

It should be apparent that the computing device 102 is generally enabled to monitor communications between various components of the system 100 to receive the media data 132, as well other communications, and determine one or more visual traits of an OOI from the media data 132, and/or perform other functionality as described herein, using any suitable combination of speech-to-text engines, audio analysis engines, video analysis engines, text analysis engines and the like. As used herein, the term "engine" refers to hardware, and/or a combination of hardware and software (e.g. a combination of hardware and software includes software hosted at hardware, such as a software module that is stored at a processor-readable memory implemented or interpreted by a processor), or hardware and software hosted at hardware.

The computing device 102, having determined one or more visual traits of an from the media data 132 (e.g. such a "Middle-Aged Woman" and a "White Jacket") searches the first video stream 106-1 for the OOI. However, due to conditions of the first video stream 106-1, and the like, the computing device 102 may not be identify the OOI in the first video stream 106-1 and hence searches the second video stream 106-2 for the OOI. Once the computing device 102 identifies the OOI in the second video stream 106-2, the computing device 102 may use further visual traits and/or features of the OOI determined from the second video stream 106-2 to again search the first video stream 106-1 for the OOI. For example, the computing device 102 may find a middle-aged woman wearing a white jacket in the second video stream 106-2 and determine she is also wearing glasses, earrings and carrying a purse, and/or the computing device 102 may identify the woman's face, and/or gait, and the like. The computing device 102 may use such determined further visual traits and/or features of the OOI determined from the second video stream 106-2 to search the first video stream 106-1 for the woman and, once the woman is identified in the first video stream 106-1, the computing device 102 alters the first video stream 106-1 as rendered at the display screen 116, to visually indicate the OOI and/or one or more of the visual traits determined from the media data 132.

Figure 2:
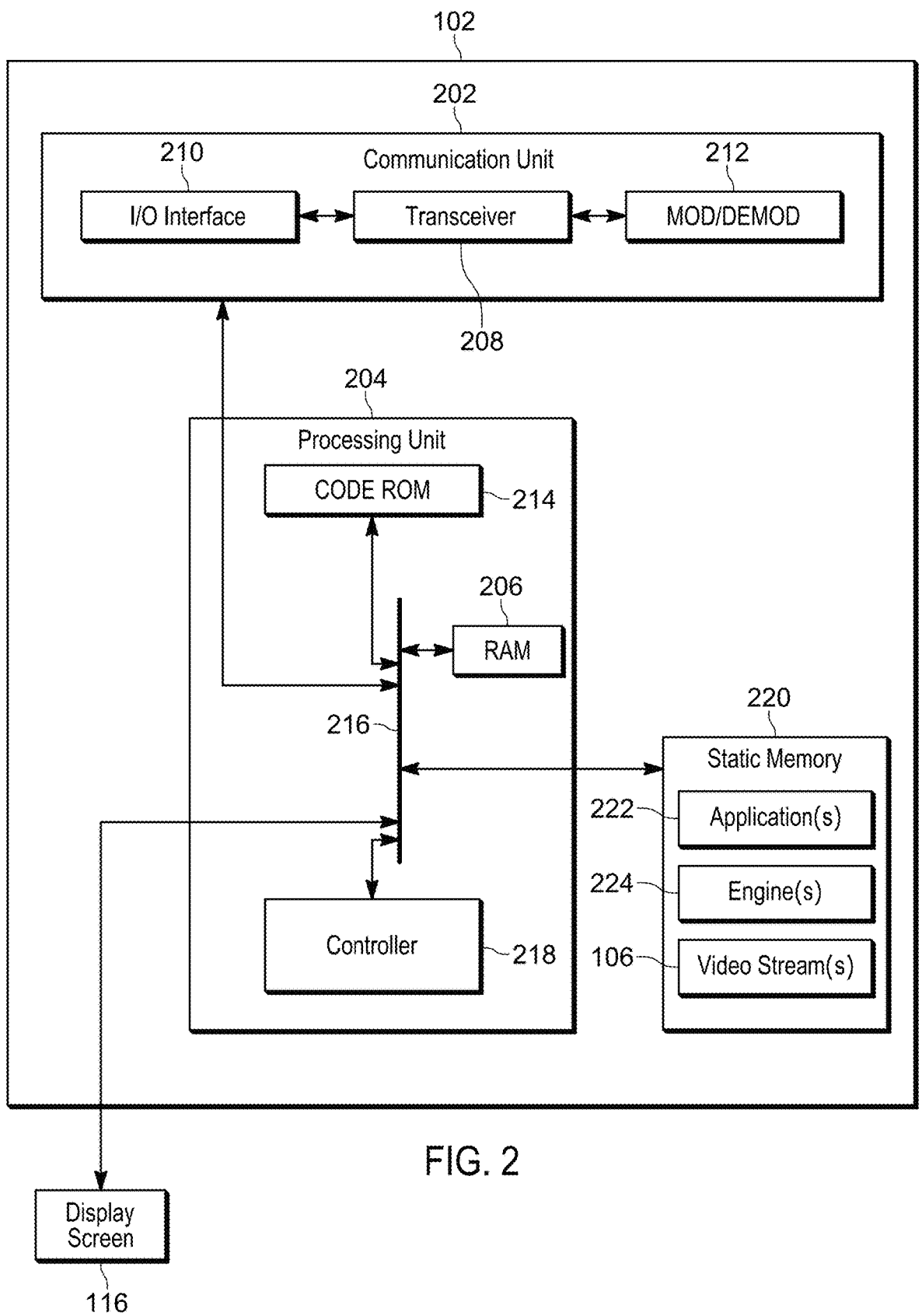
FIG. 2 is a device diagram showing a device structure of communication device for altering video streams to identify objects of interest, in accordance with some examples.

Attention is next directed to FIG. 2, which depicts a schematic block diagram of an example of the computing device 102. While the computing device 102 is depicted in FIG. 2 as a single component, functionality of the computing device 102 may be distributed among a plurality of components, such as a plurality of servers and/or cloud computing devices.

As depicted, the computing device 102 comprises: a communication unit 202, a processing unit 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. The controller 218 is understood to be communicatively connected to other components of the computing device 102 via the common data and address bus 216. Hereafter, the at least one application 222 will be interchangeably referred to as the application 222.

As depicted, the memory 220 further stores one or more engines 224, for example for analyzing the media data 132 to determine one or more visual traits of an OOI, and/or identify OOIs in video streams using such visual traits and/or determine further visual traits of OOIs, and/or any other suitable functionality as described herein.

As depicted, the memory 220 further stores one or more of the video streams 106, and/or portions thereof (e.g. a last 24 hours of a video stream 106) received from the cameras 104, for example for later analysis and/or review. The stored video streams 106 may at least include the second video stream 106-2. The video streams 106 may alternatively be stored at a memory and/or database external to the computing device 102, but accessible to the computing device 102.

Furthermore, while the memories 206, 214 are depicted as having a particular structure and/or configuration, (e.g., separate RAM 206 and ROM 214), memory of the computing device 102 may have any suitable structure and/or configuration.

While not depicted, the computing device 102 may include one or more of an input device and/or a display screen, which are also understood to be communicatively coupled to the communication unit. However, as depicted, the controller 218 is depicted as communicatively coupled to the display screen 116 external to the computing device 102.

As shown in FIG. 2, the computing device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for altering video streams to identify objects of interest. For example, in some examples, the computing device 102 and/or the controller 218 specifically comprises a computer executable engine configured to implement functionality for altering video streams to identify objects of interest.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

While the one or more engines 224 are depicted as being separate from the application 222, the one or more engines 224 may comprise modules of the application 222.

Figure 3:
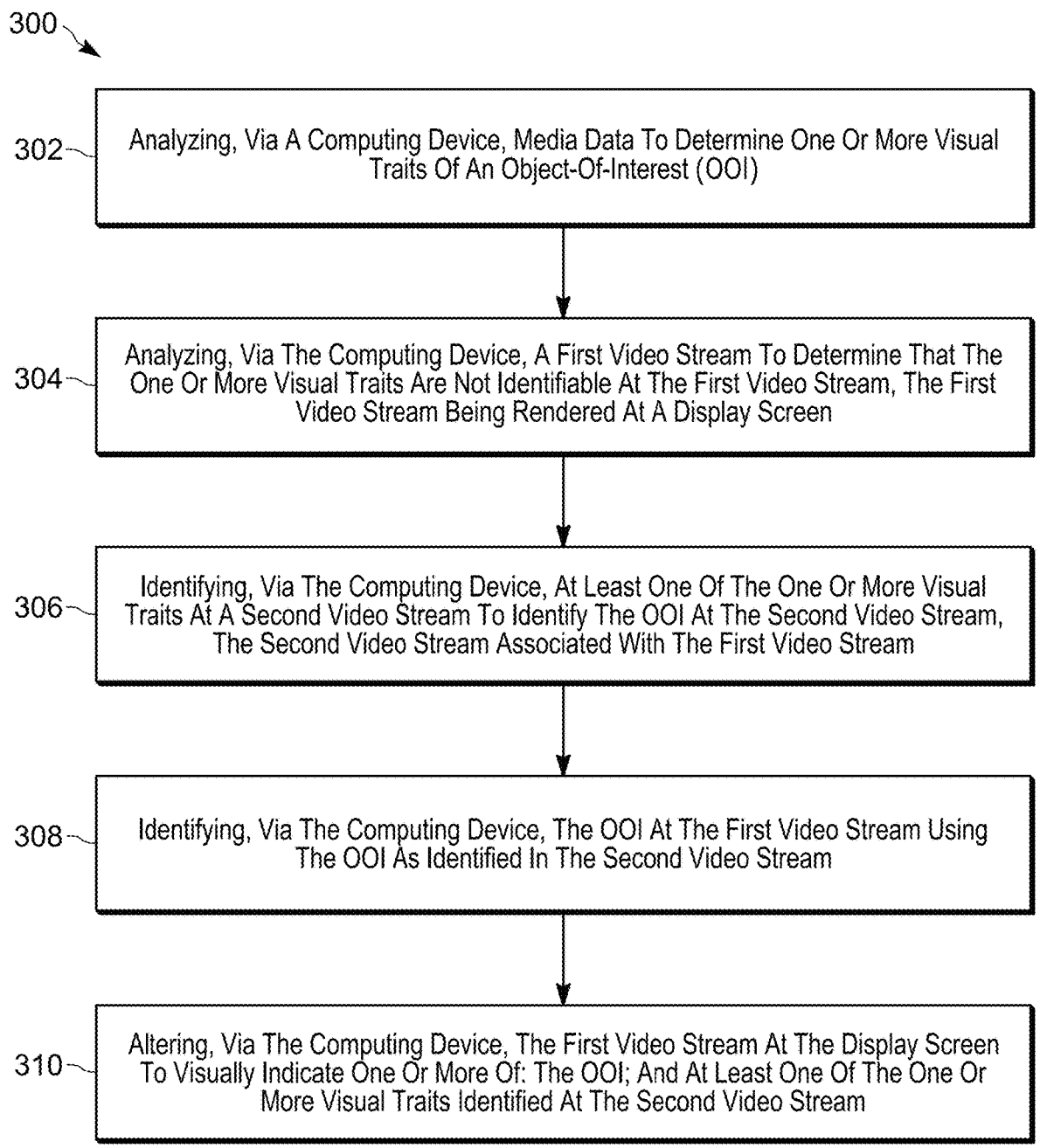
FIG. 3 is a flowchart of a method for altering video streams to identify objects of interest, in accordance with some examples.

Furthermore, the memory 220 stores instructions corresponding to the at least one application 222 that, when executed by the controller 218, enables the controller 218 to implement functionality for altering video streams to identify objects of interest, including but not limited to, the blocks of the method set forth in FIG. 3.

The application 222 and/or the engines 224 may include programmatic algorithms, and the like, to implement functionality as described herein.

Alternatively, and/or in addition to programmatic algorithms, the application 222 and/or the one or more engines 224 may include one or more machine learning algorithms to implement functionality as described herein. The one or more machine learning algorithms of the application 222 and/or the one or more engines 224 may include, but are not limited to one or more of: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

In examples where the application 222 and/or the one or more engines 224 includes one or more machine learning algorithms, the computing device 102 may be operated in a learning mode to "teach" the one or more machine learning algorithms to implement respectively functionality thereof. For example feedback may be provided to the computing device 102 indicating accuracy of one or more identified visual traits of an OOI, and/or accuracy of an OOI identified in the second video stream 106-2, and/or accuracy of determined further visual traits of an OOI, such that one or more identified visual traits of an OOI, and/or accuracy of an OOI identified in a video stream, and/or accuracy of further visual traits of an OOI that are later determined, may be more accurate.

While details of the cameras 104, the PSAP terminal 112, the communication devices 122, 124, etc., are not depicted, the cameras 104, the PSAP terminal 112, the communication devices 122, 124, etc., may have components similar to the computing device 102 but adapted for the respective functionality thereof. For example, a camera 104 is understood to include one or more sensors, and the like, for acquiring a video stream 106, such one or more sensors including, but not limited to, a camera, a video camera, a microphone, and/or any other suitable sensor and/or a combination thereof.

Attention is now directed to FIG. 3, which depicts a flowchart representative of a method 300 for altering video streams to identify objects of interest. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222 and/or the one or more engines 224. The method 300 of FIG. 3 is one way that the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

It is further understood in the description of the method 300, that the communication unit 202 is generally configured to receive media data and video streams, and that the controller 218 and/or the computing device 102 may receive media data and video streams via the communication unit 202.

At a block 302, the controller 218 and/or the computing device 102 analyzes the media data 132 to determine one or more visual traits of an object-of-interest (OOI).

The media data 132 may comprise one or more of audio (e.g. first audio) received from the microphone 126, audio (e.g. second audio) received via the headset 120, text received via one or more of the communication devices 122, 124, (e.g. and/or from another communication device 124), an image received via one or more of the communication devices 122, 124, video received via one or more of the communication devices 122, 124, and the like.

Hence, in some examples, analyzing the media data 132 may comprise analyzing one or more of: first audio received via the microphone 126 located in an area where the display screen 116 is located; second audio received via the headset 120 associated with the display screen 116; text received via one or more of a first communication device 122 associated with the display screen 116, and a second communication device 124 in communication with the first communication device 122 (and/or another suitable communication device); an image received via one or more of the first communication device 122 and the second communication device 124 (and/or another suitable communication device); video received via one or more of the first communication device 122 and the second communication device 124 (and/or another suitable communication device); and the like.

In general, the analysis of the block 302 may include, but is not limited to, performing such analysis via one or more of the engines 224 which may be configured to, and/or trained to, search the media data 132 for given keywords, and the like, to identify one or more visual traits of an OOI. For example, the words "seen" and/or "searching" and the like in the media data 132 may indicate that an OOI is being identified in the media data 132, and words such as "woman", "man", "boy", "girl", "Middle-Aged", "young", colors, articles of clothing, items, sizes and/or heights, ages, and the like, may identify one or more visual traits of an OOI. However, analysis of the media data 132 to determine one or more visual traits of an OOI may occur in any suitable manner. Furthermore, a machine learning algorithm of the application 222 and/or the one or more engines 224 may be trained to determine one or more visual traits of an OOI from the media data 132.

Continuing with the previous example, media data 132 that incudes audio and/or text of "Has anybody seen middle-aged woman in a white jacket?", and the like, may result in a determination that a search for an OOI of a person is to occur, with visual traits of a "Middle-Aged Woman", and a "White Jacket".

While in the present example, the OOI comprises a person, it is understood that an OOI of the method 300 may comprise one or more of a person, an animal, a vehicle, and the like, including, but not limited to, combinations thereof. For example, an OOI may comprise a dog, a person walking a dog, a bicycle, a person riding a bicycle, a car, a person driving a car, amongst other possibilities, with visual traits thereof determined accordingly.

At a block 304, the controller 218 and/or the computing device 102 analyzes the first video stream 106-1 to determine that the one or more visual traits are not identifiable at the first video stream 106-1, the first video stream 106-1 being rendered at the display screen 116. Hence, in present examples, it is understood that the first video stream 106-1 may be analyzed on the basis of the first video stream 106-1 being rendered at the display screen 116.

For example, the controller 218 and/or the computing device 102, having identified the one or more visual traits, may search the first video stream 106-1 for the one or more visual traits using, for example, a video analysis engine of the one or more engines 224.

In some examples, the controller 218 and/or the computing device 102 may convert data which represents the one or more visual traits into data suitable for searching a video stream. For example, a visual trait of a "Middle-Aged Woman" that may have been received in the media data 132 as text and/or audio, may be converted to a suitable feature vector (e.g. used to search video streams and/or images), and the like, that represents middle-aged women. Similarly, a visual trait of a "White Jacket" that may have been received in the media data 132 as text and/or audio, may be converted to a suitable feature vector, and the like, that represents white jackets. Such conversion may occur via one or more of the engines 224.

Alternatively, the computing device 102 may maintain a library and/or database of generic feature vectors, and the like, that corresponds to various visual traits, and the controller 218 and/or the computing device 102 may determine feature vectors, and the like, that corresponds to a visual trait identified in the media data 132 by retrieving such a feature vector from the library and/or database. For example, such a library and/or database may store generic feature vectors, and the like, that corresponds to text and/or audio of the "Middle-Aged Woman" and the "Middle-Aged Woman", and such feature vectors, and the like, may be retrieved from the library and/or database accordingly.

However, any visual trait identified in the media data 132 may be converted into any suitable data used to search video streams (and/or images).

In another example, where the visual trait represents a color, such as red, the color may be converted into suitable color coordinates (e.g. such as 1931 CIE (Commission Internationale de l'éclairage) coordinates), and a range of coordinates, and colors of the first video stream 106-1 may similarly be converted to respective color coordinates such that the color coordinates of the visual trait of the media data 132 may be used to search the color coordinates of the first video stream 106-1.

Analyzing the first video stream 106-1, at the block 304, to determine that the one or more visual traits are not identifiable at the first video stream 106-1 may comprise one or more of:

Determining that the one or more visual traits are not present at the first video stream 106-1. For example, a search of the first video stream 106-1 using one or more feature vectors, and the like, representing the one or more visual traits determined from the media data 132 may result in a null data set, and the like, indicating the one or more visual traits have not been found and hence are not present at the first video stream 106-1.

Determining that the one or more visual traits are not identifiable due to respective colors of the one or more visual traits and the first video stream 106-1. For example, respective colors of the one or more visual traits may not be present at the first video stream 106-1, and/or the first video stream 106-1 may be in black and white, while the respective colors of the one or more visual traits may comprise combination of one or more of red, green and blue.

Determining that the one or more visual traits are not identifiable due to lighting conditions in the first video stream 106-1. In such examples, the lighting conditions in the first video stream 106-1 (e.g. in the scene 108-1 in the FOV 110-1) may make it difficult to search for certain types of feature vectors and/or colors. In a particular example, due to the position of the sun in the scene 108-1 as depicted in FIG. 1, clothing and/or colors of an OOI (e.g. such as a white jacket) may not be visible.

In some examples, determining that one or more visual traits are not identifiable at the first video stream 106-1 may be threshold based. For example, a search of the first video stream 106-1 may result in certain visual traits being identified but with a probability of success assigned to such a search. For example, a search for a "Middle-Aged Woman" wearing a "White Jacket" may result in a result but with a 10% probability assigned to the result (amongst other possibilities). Such a probability may be compared to threshold probability, such as 80%, 90%, 95%, amongst other possibilities, and when the probability is lower than the threshold probability, the controller 218 and/or the computing device 102 may determine that the one or more visual traits of a "Middle-Aged Woman" wearing a "White Jacket" are not identifiable at the first video stream 106-1. However, such a determination may occur in any suitable manner.

Again, continuing with the previous example, the analysis of the block 304 may result in not finding an OOI of a "Middle-Aged Woman" wearing a "White Jacket" in the first video stream 106-1, though such analysis may result in finding a plurality of woman who are "Middle-Aged" but none wearing a "White Jacket". For example, any white jackets in the first video stream 106-1 may appear gray due to the lighting conditions in the first video stream 106-1.

Having failed to find the OOI identified in the media data 132 in the first video stream 106-1, at a block 306, the controller 218 and/or the computing device 102 identifies at least one of the one or more visual traits at the second video stream 106-2 to identify the OOI (e.g. of the block 302) at the second video stream 106-2, the second video stream 106-2 associated with the first video stream 106-1.

For example, the controller 218 and/or the computing device 102 may perform same and/or similar analysis on the second video stream 106-2, as described above with respect to the first video stream 106-1, to search the second video stream 106-2, for the one or more visual traits of the OOI.

It is further understood that the video streams 106 are associated. For example, video streams 106 from the camera 104 may be associated due to a geographical relationship between the cameras 104, which may be in a same and/or similar location, and/or along a same road, and/or within a given area, and the like. For example, geographical locations of the cameras 104 may be stored at the memory 220, and/or associations and/or geographical relationship between the cameras 104 may be stored at the memory 220.

When more than one second camera 104 is available in the system 100, the controller 218 and/or the computing device 102 may select a second camera 104 using the geographical locations of the cameras 104, and the like. In other examples, selection of such a second camera 104 may be based on geofencing techniques, with the second camera 104 selected to be withing a given distance from the first camera 104-1 (e.g. 10 meters, 20 meters, 100 meters, amongst other possibilities).

In other examples, selection of such a second camera 104 may be based on movement of potential OOIs in the first video stream 106-1. For example, when the potential OOIs (e.g. such as identified middle-aged woman) are moving away from a given location, the controller 218 and/or the computing device 102 may select a second camera 104 at, and/or near, the given location to increase a possibility of identifying the OOI (e.g. of the block 302) in a video stream 106 from this second camera 104, that may have been acquired at an earlier time, and under better lighting conditions and/or when a given item of the OOI (such as a weapon, and the like) may be visible.

Hence, in general, the controller 218 and/or the computing device 102 searches the second video stream 106-2 for the one or more visual traits of the OOI to identify the OM at the second video stream 106-2.

Having identified the OOI at the second video stream 106-2, the controller 218 and/or the computing device 102 may determine further visual traits of the OOI and/or other features of the OOI, that are different from the one or more visual traits used to initially search the first video stream 106-1, and use such further visual traits to again search the first video stream 106-1 for the OM.

For example, the controller 218 and/or the computing device 102 may find an having visual traits of a "Middle-Aged Woman" wearing a "White Jacket" in the second video stream 106-2, and further determine facial features of the woman, a gait of the woman, a build of the woman, other types of clothing and/or accessories (e.g. a purse, earrings, and the like) worn by the woman, whether the woman is wearing glasses, a type of haircut of the woman, a type of the jacket (e.g. a parka, and the like), and/or any other suitable type of feature. Such further visual traits may comprise data (e.g. such as feature vectors), and/or may be converted to data (e.g. such as feature vectors), that may be used to again search the first video stream 106-1 for the OOI.

At a block 308, the controller 218 and/or the computing device 102 identifies the OOI at the first video stream 106-1 using the OOI as identified in the second video stream 106-2. For example, the controller 218 and/or the computing device 102 may search the first video stream 106-1 for the OOI using the further visual traits identified in the second video stream 106-2, for example in the form of data used to video streams and/or images, similar to as described above.

At a block 310, assuming that the OOI has been identified in the first video stream 106-1, the controller 218 and/or the computing device 102 alters the first video stream 106-1 at the display screen 116 to visually indicate one or more of: the OOI; and the at least one of the one or more visual traits identified at the second video stream 106-2.

For example, altering the first video stream 106-1 at the display screen 116 to visually indicate one or more of: the OOI; and the at least one of the one or more visual traits (e.g. of the media data 132) identified at the second video stream 106-2, may comprise one or more of:

Altering, at the display screen 116, one or more colors of one or more of the OOI and the at least one of the one or more visual traits. For example, continuing with the previous example, a color of a jacket of the OOI in the first video stream 106-1 at the display screen 116 may be changed to white (e.g. from gray). However, any suitable color may be used.

Providing, at the display screen 116, an outline around one or more of the OOI and the at least one of the one or more visual traits. For example, at the display screen 116, line may be drawn around the OOI (and/or their jacket) that may be of a weight and/or color that is selected (e.g. heuristically and/or using human-machine interface studies) to cause a human (e.g. such as the operator 114) to visually locate an item in an image.

Providing, at the display screen 116, an image at one or more of the OOI and the at least one of the one or more visual traits. For example, continuing with the previous example, an image of a jacket and/or a white jacket, may be overlaid onto the OOI in the first video stream 106-1 at the display screen 116. However, any suitable image may be used.

The method 300 may comprise other features.

For example, as previously described, the first video stream 106-1 is generally from the first camera 104-1 and the second video stream 106-2 is generally from the second camera 104-2, and the first camera 104-1 and the second camera 104-2 may have respective non-overlapping fields-of-view 110. However in other examples, the respective fields-of-view 110 may partially overlap, though the angles of such respective fields-of-view 110 may be different such that images of possible OOIs are captured from different angles.

Furthermore, as previously described, the first video stream 106-1 and the second video stream 106-2 may be from respective non-overlapping time periods. For example, the first video stream 106-1 may be "live" and/or in "real-time" while the second video stream 106-2 that is analyzed at the block 306 may be recorded and/or earlier in time than the live and/or real time first video stream 106-1.

However, in some examples, both video streams 106 may be recorded and the operator 114 may be reviewing a recording of the first video stream 106-1 (e.g. as stored at the memory 220) at the display screen 116. In these examples, the second video stream 106-2 may be from a time period that is earlier or later than a respective time period of the first video stream 106-1 that is being reviewed. In some of these examples, the second video stream 106-2 may be from a same and/or similar time as a respective time period of the first video stream 106-1 that is being reviewed; for example, the second video stream 106-2 may comprises images of potential OOIs of the first video stream 106-1, at a same time, but from a different angle.

In some examples, at the blocks 304, 306, the identifying the at least one of the one or more visual traits at the second video stream 106-2, to identify the OOI at the second video stream 106-2, may occur in two steps. For example, the method 300 may further comprise the controller 218 and/or the computing device 102:

Using a first visual trait, of the one or more visual traits (determined at the block 302), to identify potential OOIs at the first video stream 106-1; and Identifying the OOI in the second video stream 106-2, from one or more of the potential OOIs, using a second visual trait, of the one or more visual traits.

Continuing with the previous example, the controller 218 and/or the computing device 102 may initially search the first video stream 106-1 for a first visual trait of a "Middle-Aged Woman" and find two (or more) potential OOIs in the first video stream 106-1 that have such a first visual trait. However, a second visual trait of a "White Jacket" (e.g. being worn by a "Middle-Aged Woman") may not be identifiable in the first video stream 106-1, and hence a specific OOI of a "Middle-Aged Woman" wearing a "White Jacket" may be not identifiable in the first video stream 106-1.

As such, in the second video stream 106-2, the controller 218 and/or the computing device 102 may identify one or more of the same two (or more) potential OOIs of the first video stream 106-1 that have such a first visual trait of a "Middle-Aged Woman", and ignore other potential OOIs in the second video stream 106-2. The controller 218 and/or the computing device 102 may identify the OOI of a "Middle-Aged Woman" wearing a "White Jacket" in the second video stream 106-2, from one or more of the potential OOIs, using a second visual trait, of the one or more visual traits, such as the "White Jacket". Having identified the OOI from the potential OOIs, the controller 218 and/or the computing device 102 may identify the OOI in the first video stream 106-1 by selecting the OOI from the potential OOIs in the first video stream 106-1, and alter the first video stream 106-1 to identify the OOI, as described herein.

In this manner, the controller 218 and/or the computing device 102 may: first identify potential OOIs in the first video stream 106-1 that share a first visual trait identified in the media data 132; use such identification to identify one or more of the potential OOIs in the second video stream 106-2; and analyze the one or more of the potential OOIs in the second video stream 106-2 using a second visual trait identified in the media data 132. Identifying one or more of the potential OOIs in the second video stream 106-2 may include, but is not limited to, using other visual traits of the possible OOIs identified in the first video stream 106-1 to search the second video stream 106-2 for the possible OOIs. When the OOI, of the possible OOIs, is identified in the second video stream 106-2, such an identification may enable the controller 218 and/or the computing device 102 to identify the OOI in the first video stream 106-1, for example without determining yet further visual traits of the OOI from the second video stream 106-2 and/or without performing another search of the first video stream 106-1, as the OOI has been determined to be a specific one of the potential OOIs of the first video stream 106-1.

Put another way, the method 300 may further comprise the controller 218 and/or the computing device 102: filtering a subset of potential OOIs from the first video stream 106-1 using a first visual trait of the one or more visual traits (e.g. determine at the block 302); and, after the filtering, identifying the OOI in the second video stream 106-2, from one or more of the potential OOIs (e.g. identified in the second video stream 106-2), using a second visual trait, of the one or more visual traits (e.g. determine at the block 302).

In yet further examples, the method 300 may further comprise, the controller 218 and/or the computing device 102:

Analyzing environmental conditions in an area where the display screen 116 is located to determine that the one or more visual traits are not identifiable at the first video stream 106-1; and Responsively identifying the at least one of the one or more visual traits at the first video stream 106-1 to identify the OOI at the first video stream 106-1.

For example, using images, and/or other data, from the sensor and/or camera 128, the controller 218 and/or the computing device 102 may determine (e.g. using a machine learning algorithm of the application 222 and/or the engines 224 that has been accordingly trained) that light levels and/or a color of light in the area where the display screen 116 is located may make it difficult and/or challenging for the operator 114 to review the first video stream 106-1 for the OOI. For example, a visual trait of the OOI may include an article of clothing that is red, and images, and/or other data from the sensor and/or camera 128 may indicate that a red light is shining onto the display screen 116, such that the article of red clothing may not be identifiable at the display screen 116. As such, the controller 218 and/or the computing device 102 alters the first video stream 106-1 to identify the OOI at the first video stream 106-1.

Such a determination may be based on other factors, such as a relative light level and/or humidity and/or temperature in the area where the display screen 116 is located, and/or any other suitable environmental condition, with functionality of the sensor and/or camera 128 selected accordingly.

For example, the sensor and/or camera 128 may comprise a light sensor and the controller 218 and/or the computing device 102 may determine (e.g. using a machine learning algorithm of the application 222 and/or the engines 224 that has been accordingly trained) that light in the area where the display screen 116 is very bright (which may be a threshold based determination) as compared to a light level of the first video stream 106-1 at the display screen 116, making an OOI challenging to identify, and responsively alter the first video stream 106-1 to identify the OOI at the first video stream 106-1.

Similarly, the sensor and/or camera 128 may comprise a temperature and/or humidity sensor, and the controller 218 and/or the computing device 102 may determine (e.g. using a machine learning algorithm of the application 222 and/or the engines 224 that has been accordingly trained) that temperature and/or humidity in the area where the display screen 116 (which may be based on heuristically determined threshold temperatures and/or humidity) may be distracting the operator 114, making an OOI challenging to identify, and responsively alter the first video stream 106-1 to identify the OOI at the first video stream 106-1.

Aspects of the method 300 will next be described with respect to FIG. 4, FIG. and FIG. 6, which are substantially similar to FIG. 1, with like components having like numbers. As depicted, aspects of the method 300 may be implemented by the application 222 and/or one or more of the engines 224, represented in FIG. 4, FIG. 5 and FIG. 6 via arrows numbered "222, 224".

Figure 4:
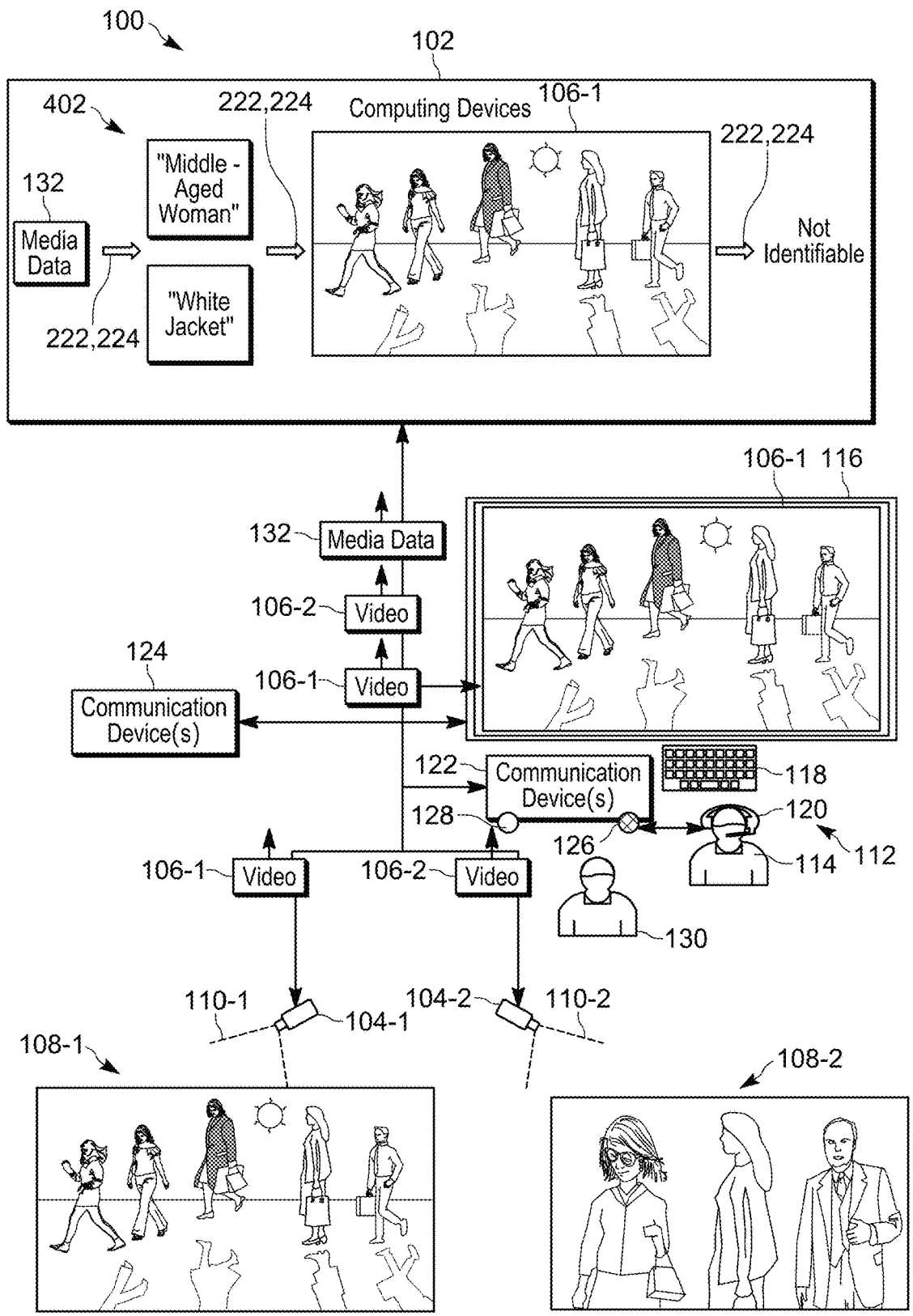
FIG. 4 depicts the system of FIG. 1 implementing aspects of a method for altering video streams to identify objects of interest, in accordance with some examples.

Attention is first directed to FIG. 4. The computing device 102 analyzes (e.g. at the block 302 of the method 300) the media data 132 to determine visual traits 402 of an OOI, such as a "Middle-Aged Woman" wearing a "White Jacket". It is understood that the visual traits 402 may be in the form of feature vectors.

In FIG. 4, the computing device 102 analyzes (e.g. at the block 304 of the method 300) the first video stream 106-1, for example to search for the visual traits 402. As depicted, the computing device 102 determines (e.g. also at the block 304 of the method 300) that the visual traits 402 are not identifiable in the first video stream 106-1.

Figure 5:
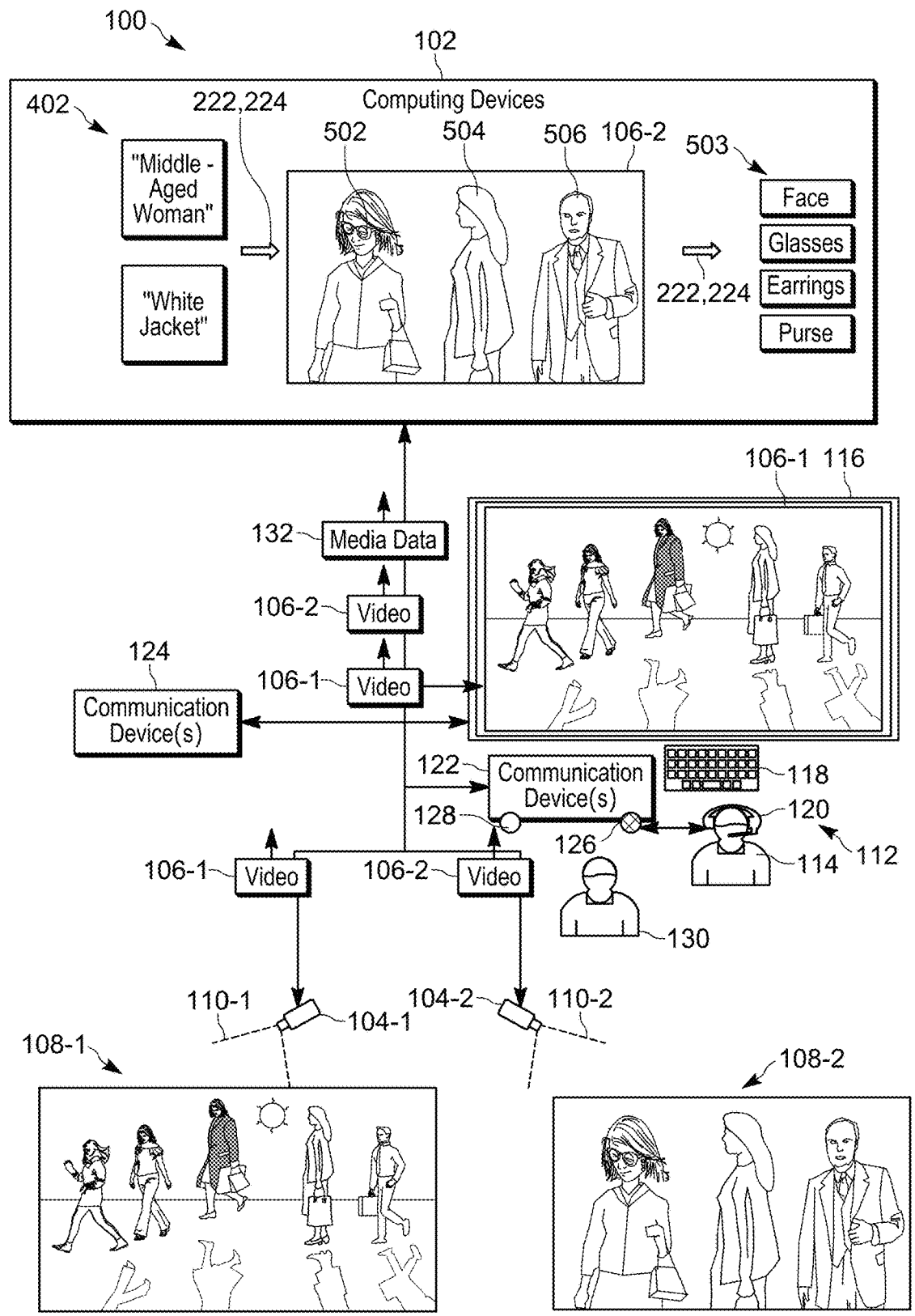
FIG. 5 depicts the system of FIG. 1 implementing further aspects of a method for altering video streams to identify objects of interest, in accordance with some examples.

Attention is next directed to FIG. 5. The computing device 102 identifies (e.g. at the block 306 of the method 300) the visual traits 402 in the second video stream 106-2, and furthermore identifies an OOI 502 in the second video stream 106-2 as being a "Middle-Aged Woman" wearing a "White Jacket". As such, the computing device 102 may analyze the OOI 502 to determine further visual traits 503 of the OOI 502, for example, as depicted, feature vectors identifying a "Face", "Glasses", "Earrings" and a "Purse" of the OOI 502.

The computing device 102 may further analyze other possible OOIs 504, 506 in the second video stream 106-2, to determine they do not include the visual traits 402 (e.g. though the OOI 504 may have a visual trait of a "Middle-Aged Woman" she is not wearing a white jacket). Such possible OOIs 504, 506 are then ignored.

Figure 6:
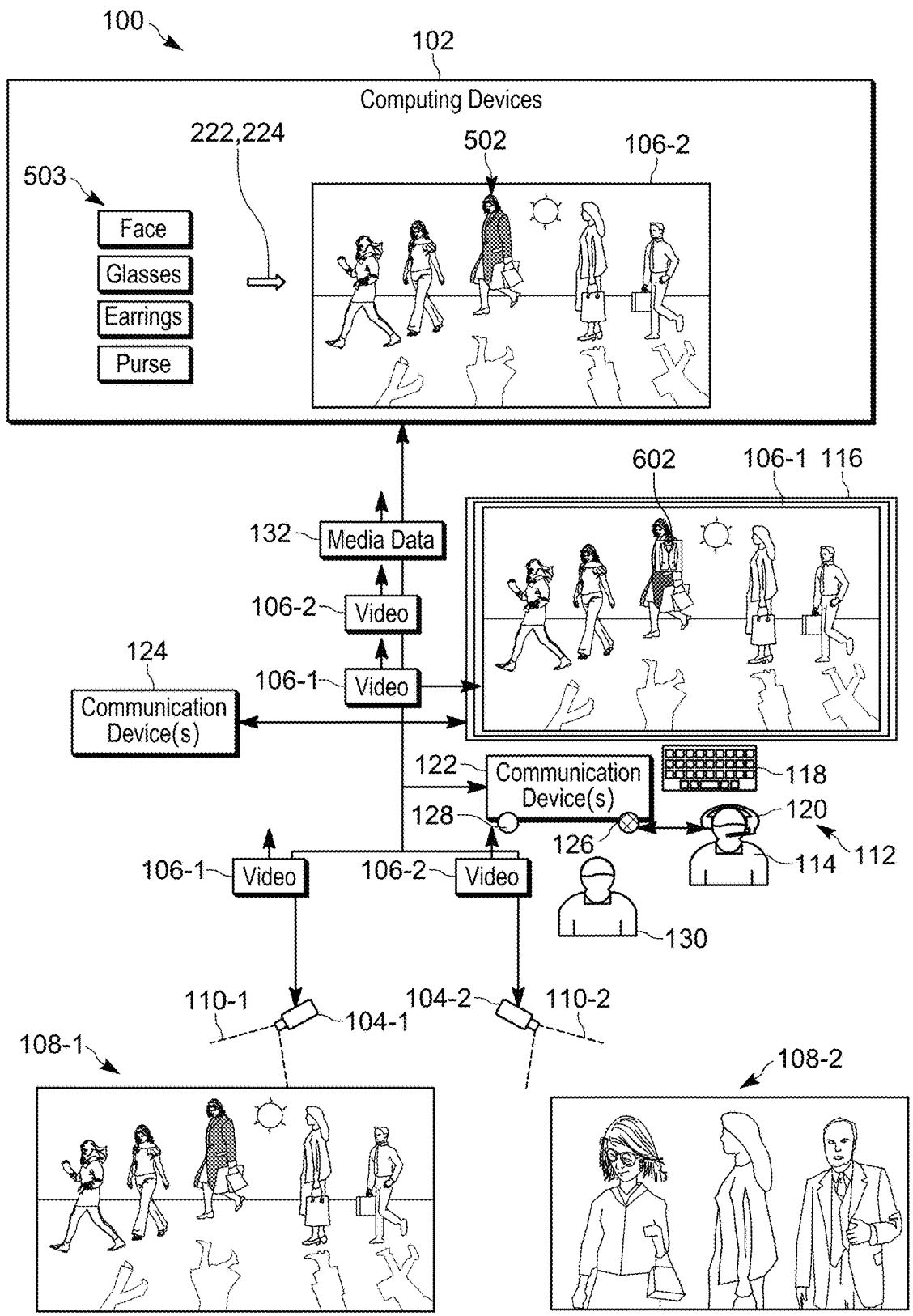
FIG. 6 depicts the system of FIG. 1 implementing yet further aspects of a method for altering video streams to identify objects of interest, in accordance with some examples.

Attention is next directed to FIG. 6. The computing device 102 identifies (e.g. at the block 308 of the method 300) the OOI 502 at the first video stream using the OOI 502 as identified in the second video stream 106-2, for example using the further visual traits 503. The computing device 102 alters (e.g. at the block 310 of the method 300) the first video stream 106-1 at the display screen 116 to visually indicate the OOI 502, for example by placing an image 602 of a white jacket (e.g. one of the visual traits 402) on the OOI 502.

While the example in FIG. 4, FIG. 5, and FIG. 6 is described with respect to using all the visual traits 402 to identify the OOI 502 in the second video stream 106-2, in other examples, the computing device 102 may first identify the OOIs 504, 506 in the first video stream 106-1 using a first visual trait 402 of a "Middle-Aged Woman", use visual traits of the identified OOIs 504, 506, determined from first video stream 106-1 to identify the OOIs 504, 506 in the second video stream 106-2, and analyze the OOIs 504, 506 for a second visual trait 402 of a "White Jacket" to identify the OOI 502 and alter the first video stream 106-1 accordingly.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot control a display screen, cannot alter a video stream, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of and" one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
analyzing, via a computing device, media data to determine one or more visual traits of an object-of-interest (OOI), the media data received from a source that is different from a first camera and a second camera;
analyzing, via the computing device, a first video stream to determine that the one or more visual traits are not identifiable at the first video stream and failing to identify the OOI identified by the media data in the first video stream, the first video stream being rendered at a display screen, the first video stream received from the first camera;
in response to failing to identify the OOI identified by the media data in the first video stream, identifying, via the computing device, at least one of the one or more visual traits at a second video stream to identify the OOI at the second video stream and one or more further visual traits of the OOI, different from the one or more visual traits, the second video stream associated with the first video stream, the second video stream received from the second camera;
in response to identifying the one or more further visual traits of the OOI, different from the one or more visual traits, in the second video stream, identifying, via the computing device, the OOI at the first video stream using the one or more further visual traits of the OOI as identified in the second video stream; and altering, via the computing device, the first video stream at the display screen to visually indicate one or more of: the OOI; and at least one of the one or more visual traits identified at the second video stream.

2. The method of claim 1, wherein the first video stream is from a first camera and the second video stream is from a second camera, the first camera and the second camera having respective non-overlapping fields-of-view.

3. The method of claim 2, wherein the first video stream and the second video stream are from respective non-overlapping time periods.

4. The method of claim 1, wherein the analyzing the media data comprises analyzing one or more of:
first audio received via a microphone located in an area where the display screen is located;
second audio received via a headset associated with the display screen;
text received via one or more of a first communication device associated with the display screen, and a second communication device in communication with the first communication device;
an image received via one or more of the first communication device and the second communication device; and
video received via one or more of the first communication device and the second communication device.

5. The method of claim 1, wherein the analyzing the first video stream to determine that the one or more visual traits are not identifiable at the first video stream comprises one or more of:
determining that the one or more visual traits are not present at the first video stream;
determining that the one or more visual traits are not identifiable due to respective colors of the one or more visual traits and the first video stream; and
determining that the one or more visual traits are not identifiable due to lighting conditions in the first video stream.

6. The method of claim 1, wherein altering the first video stream at the display screen to visually indicate one or more of: the OOI; and the at least one of the one or more visual traits identified at the second video stream, comprises one or more of:
altering, at the display screen, one or more colors of one or more of the OOI and the at least one of the one or more visual traits;
providing, at the display screen, an outline around one or more of the OOI and the at least one of the one or more visual traits; and
providing, at the display screen, an image at one or more of the OOI and the at least one of the one or more visual traits.

7. The method of claim 1, further comprising:
using a first visual trait, of the one or more visual traits, to identify potential OOIs at the first video stream; and
identifying the OOI in the second video stream, from one or more of the potential OOIs, using a second visual trait, of the one or more visual traits.

8. The method of claim 1, further comprising:
filtering a subset of potential OOIs from the first video stream using a first visual trait of the one or more visual traits; and, after the filtering,
identifying the OOI in the second video stream, from one or more of the potential OOIs, using a second visual trait, of the one or more visual traits.

9. The method of claim 1, wherein the OOI comprises one or more of a person, an animal and a vehicle.

10. The method of claim 1, further comprising:
analyzing environmental conditions in an area where the display screen is located to determine that the one or more visual traits are not identifiable at the first video stream; and
responsively identifying the at least one of the one or more visual traits at the second video stream to identify the OOI at the second video stream.

11. A device comprising:
a communication unit configured to receive media data and video streams; and
a controller configured to:
analyze media data to determine one or more visual traits of an object-of-interest (OOI), the media data received from a source that is different from a first camera and a second camera;
analyze a first video stream to determine that the one or more visual traits are not identifiable at the first video stream and failing to identify the OOI identified by the media data in the first video stream, the first video stream being rendered at a display screen, the first video stream received from the first camera;
in response to failing to identify the OOI identified by the media data in the first video stream, identify at least one of the one or more visual traits at a second video stream to identify the OOI at the second video stream and one or more further visual traits of the OOI, the second video stream associated with the first video stream, the second video stream received from the second camera;
in response to identifying the one or more further visual traits of the OOI, different from the one or more visual traits, in the second video stream, identify the OOI at the first video stream using the one or more further visual traits of the OOI as identified in the second video stream; and
alter the first video stream at the display screen to visually indicate one or more of: the OOI; and at least one of the one or more visual traits identified at the second video stream.

12. The device of claim 11, wherein the first video stream is from a first camera and the second video stream is from a second camera, the first camera and the second camera having respective non-overlapping fields-of-view.

13. The device of claim 12, wherein the first video stream and the second video stream are from respective non-overlapping time periods.

14. The device of claim 11, wherein the controller is further configured to analyze the media data by analyzing one or more of:
first audio received via a microphone located in an area where the display screen is located;
second audio received via a headset associated with the display screen;
text received via one or more of a first communication device associated with the display screen, and a second communication device in communication with the first communication device;
an image received via one or more of the first communication device and the second communication device; and
video received via one or more of the first communication device and the second communication device.

15. The device of claim 11, wherein the controller is further configured to analyze the first video stream to determine that the one or more visual traits are not identifiable at the first video stream by one or more of:

determining that the one or more visual traits are not present at the first video stream;

determining that the one or more visual traits are not identifiable due to respective colors of the one or more visual traits and the first video stream; and determining that the one or more visual traits are not identifiable due to lighting conditions in the first video stream.

16. The device of claim 11, the controller is further configured to alter the first video stream at the display screen to visually indicate one or more of: the OOI; and the at least one of the one or more visual traits identified at the second video stream, by one or more of:

altering, at the display screen, one or more colors of one or more of the OOI and the at least one of the one or more visual traits;

providing, at the display screen, an outline around one or more of the OOI and the at least one of the one or more visual traits; and providing, at the display screen, an image at one or more of the OOI and the at least one of the one or more visual traits.

17. The device of claim 11, the controller is further configured to:

use a first visual trait, of the one or more visual traits, to identify potential OOIs at the first video stream; and identify the OOI in the second video stream, from one or more of the potential OOIs, using a second visual trait, of the one or more visual traits.

18. The device of claim 11, the controller is further configured to:

filter a subset of potential OOIs from the first video stream using a first visual trait of the one or more visual traits; and, after the filtering, identify the OOI in the second video stream, from one or more of the potential OOIs, using a second visual trait, of the one or more visual traits.

19. The device of claim 11, wherein the OOI comprises one or more of a person, an animal and a vehicle.

20. The device of claim 11, the controller is further configured to:

analyze environmental conditions in an area where the display screen is located to determine that the one or more visual traits are not identifiable at the first video stream; and responsively identify the at least one of the one or more visual traits at the second video stream to identify the OOI at the second video stream.

* * * * *